F. H. VAN HOUTEN.
DOUGH DIVIDING MACHINE.
APPLICATION FILED JUNE 13, 1911.

1,158,339.

Patented Oct. 26, 1915.
6 SHEETS—SHEET 1.

Witnesses
Thomas Durant
Herbert P. Brown

Inventor
Frank H. Van Houten

By Church & Church
his Attorneys

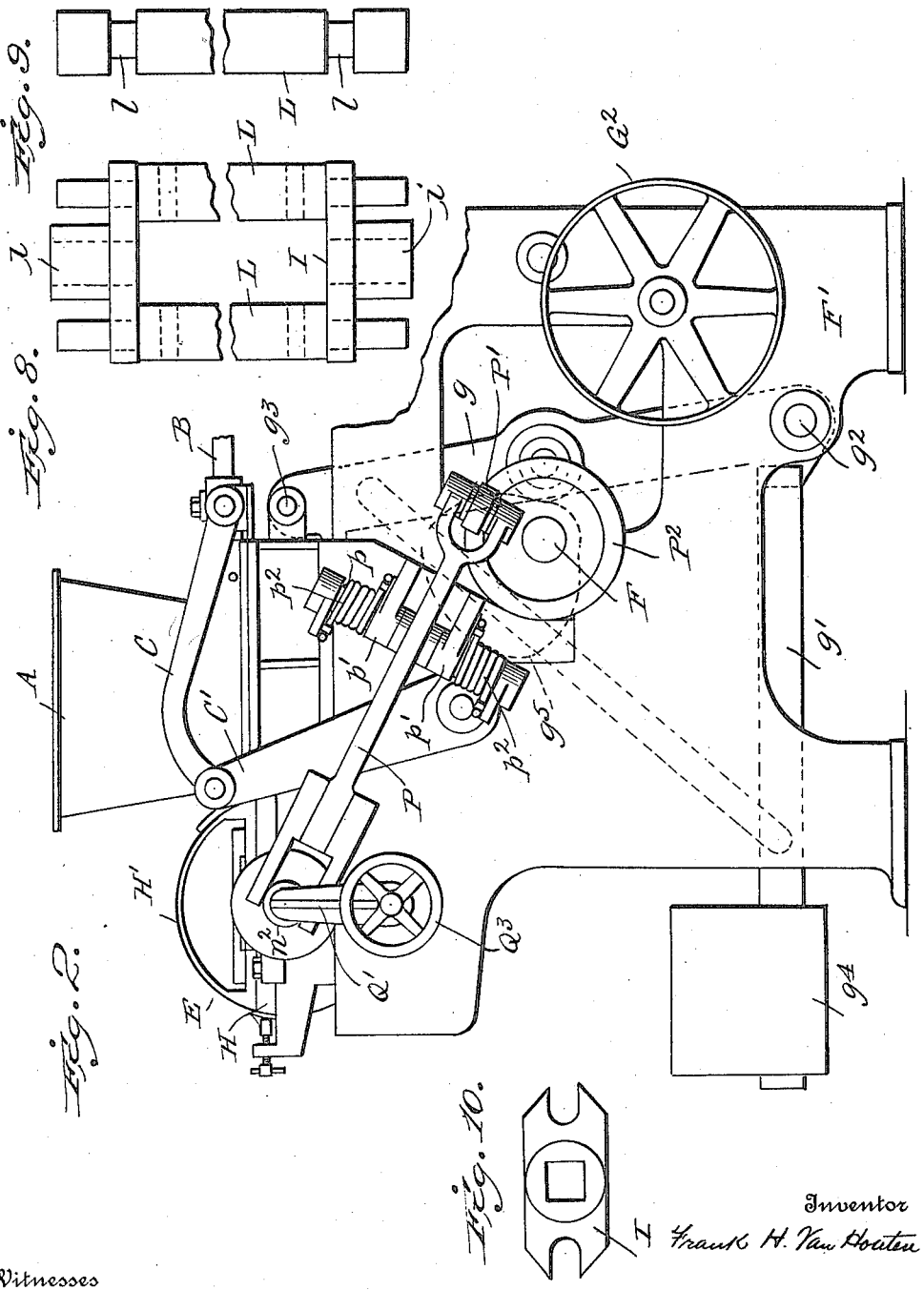

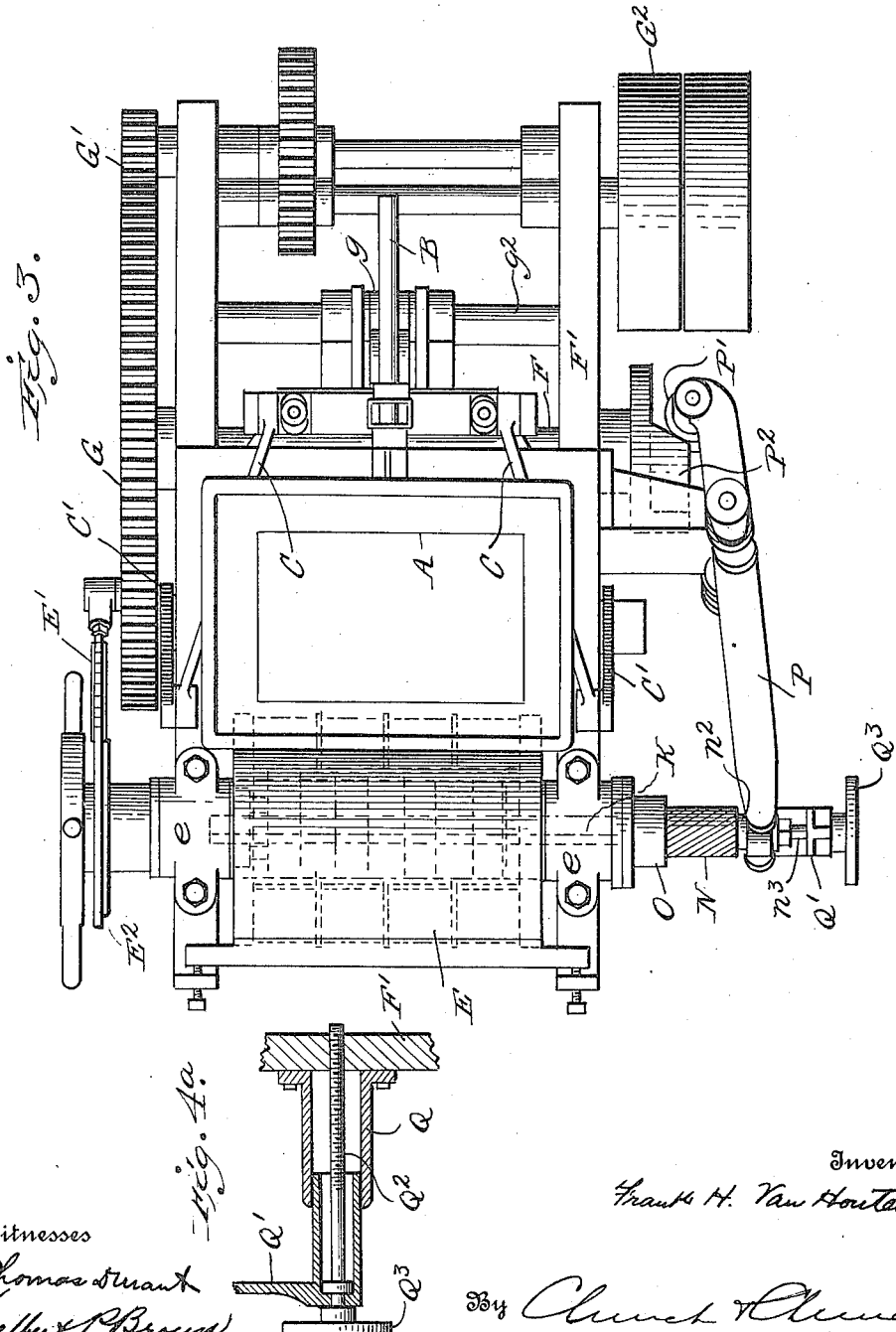

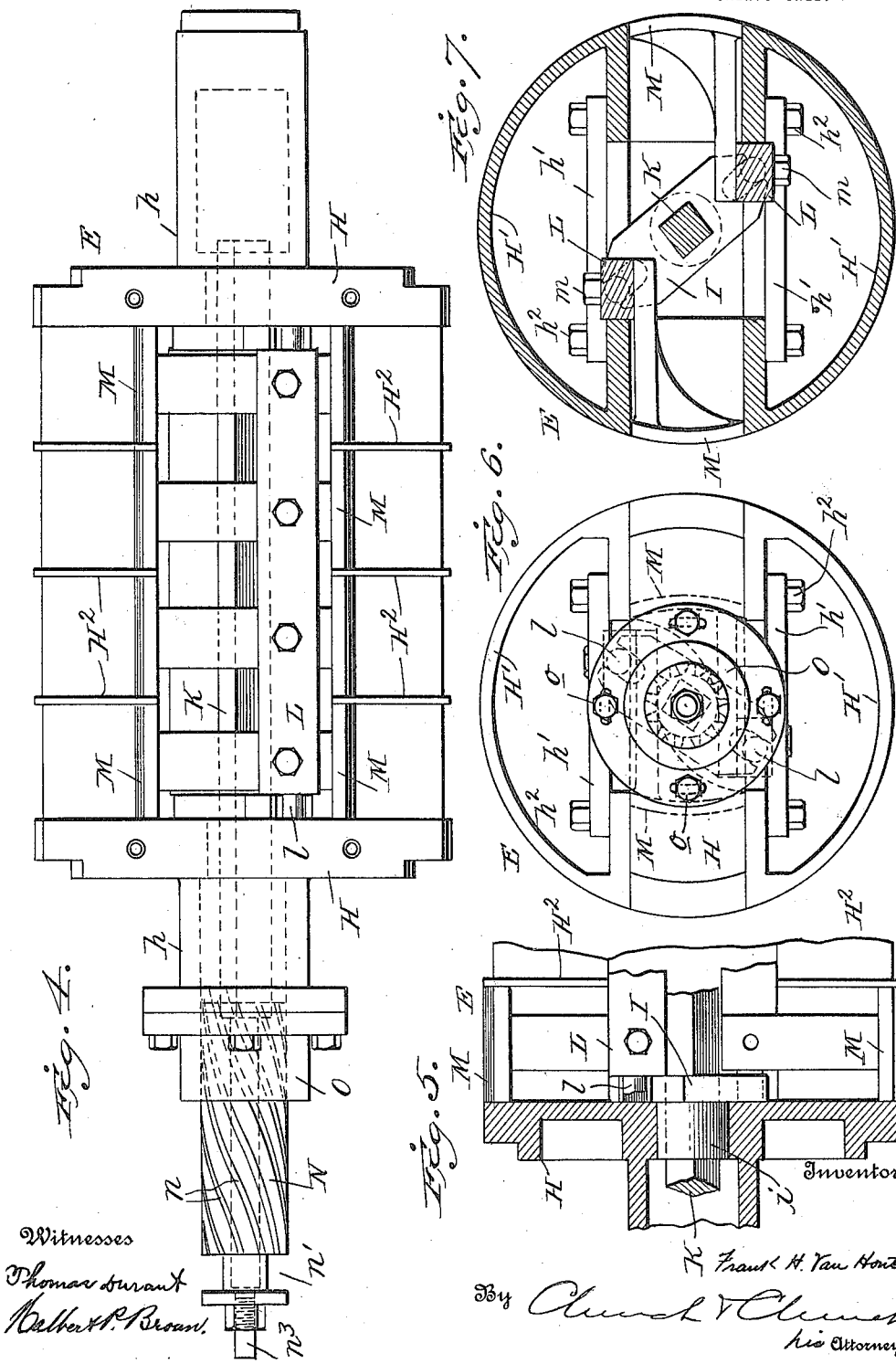

F. H. VAN HOUTEN.
DOUGH DIVIDING MACHINE.
APPLICATION FILED JUNE 13, 1911.
1,158,339.
Patented Oct. 26, 1915.
6 SHEETS—SHEET 5.
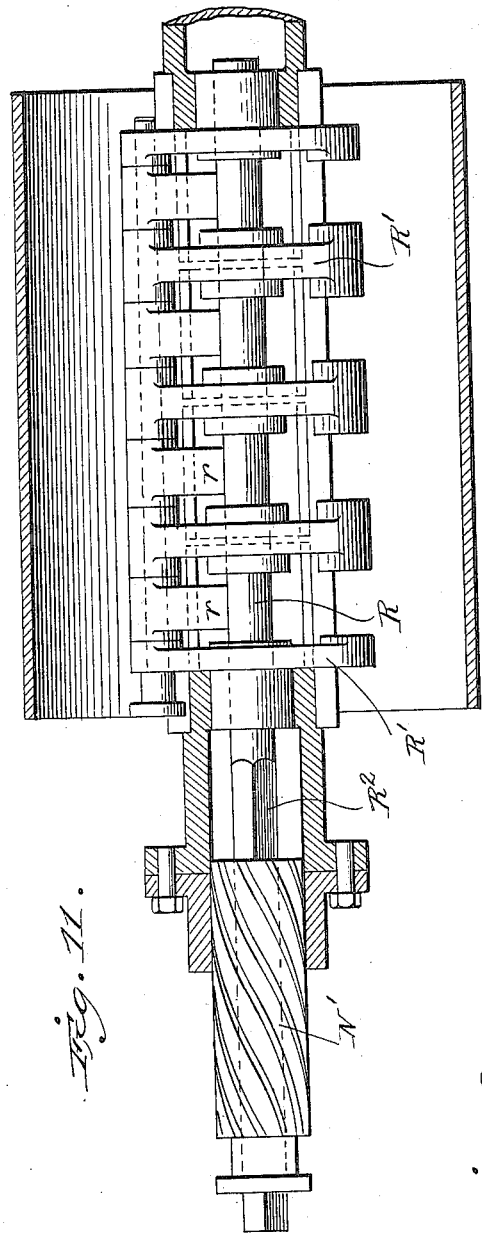
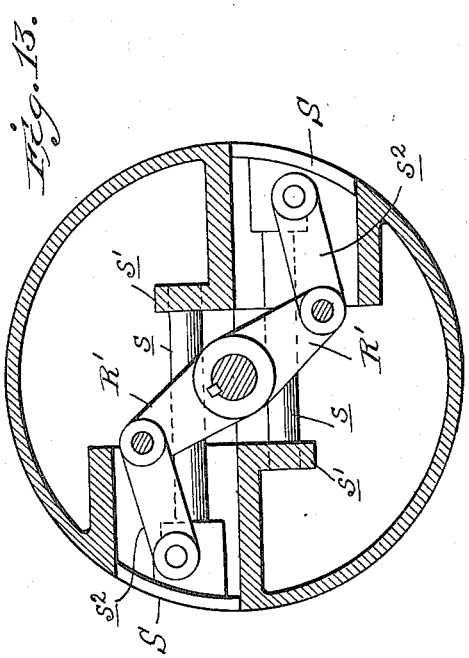
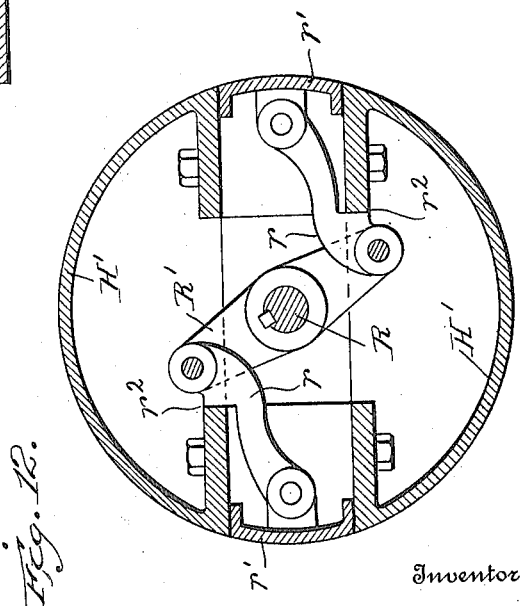

F. H. VAN HOUTEN.
DOUGH DIVIDING MACHINE.
APPLICATION FILED JUNE 13, 1911.

1,158,339.

Patented Oct. 26, 1915.
6 SHEETS—SHEET 6.

Inventor
Frank H. Van Houten

Witnesses
Thomas Durant
Walter P. Brown.

By Church & Church
his Attorneys

UNITED STATES PATENT OFFICE.

FRANK H. VAN HOUTEN, OF FISHKILL-ON-HUDSON, NEW YORK.

DOUGH-DIVIDING MACHINE.

1,158,339.  Specification of Letters Patent.  Patented Oct. 26, 1915.

Application filed June 13, 1911. Serial No. 632,853.

*To all whom it may concern:*

Be it known that I, FRANK H. VAN HOUTEN, a citizen of the United States, residing at Fishkill-on-Hudson, in the county of Dutchess and State of New York, have invented certain new and useful Improvements in Dough-Dividing Machines; and I do hereby declare the following to be a full, clear, and exact description of the same, reference being had to the accompanying drawings, forming a part of this specification, and to the figures and letters of reference marked thereon.

This invention relates to machines for dividing masses of dough into portions of proper size for the formation of loaves of bread, etc., the invention in the form illustrated herein being particularly adapted for use in dough dividing machines of the type illustrated and described in my prior Patent No. 788,123 of April 25, 1905, and in the patent to J. T. Folsom, No. 862,121, of July 30, 1907, but it will be understood that features of the invention of the present application may be applied to machines of any type wherein movable measuring pockets are employed which are made adjustable in capacity for determining the quantity of dough to be embodied in a single portion which will subsequently form a loaf.

Figure 1:
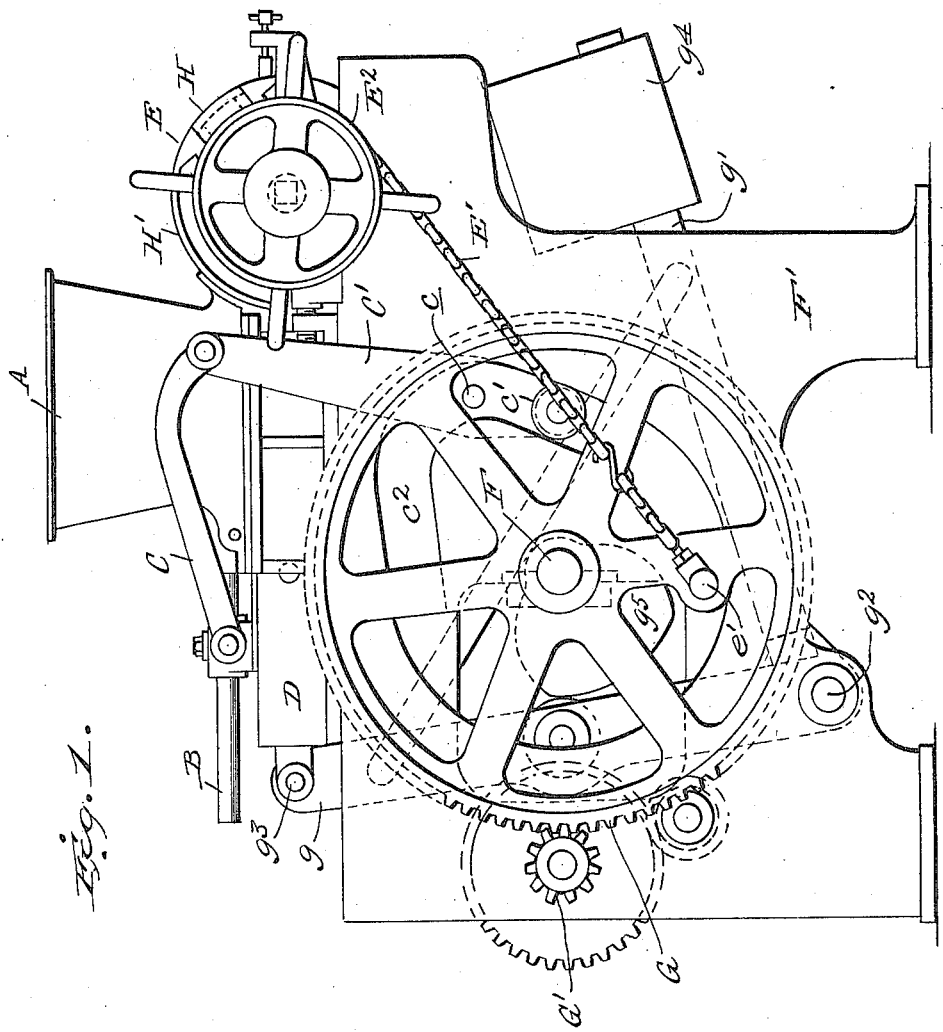
Figure 15:
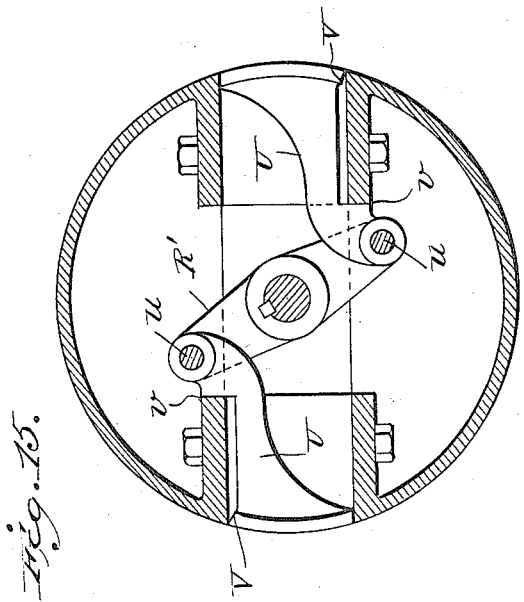
Figure 14:
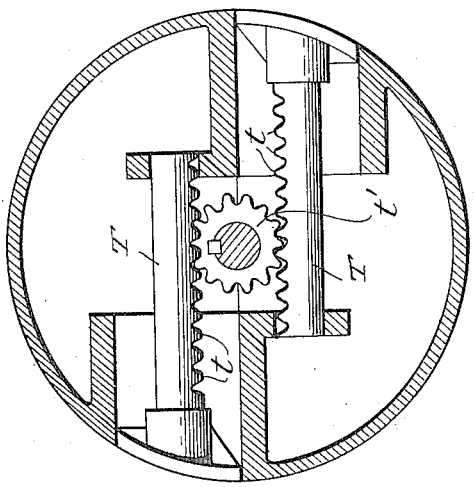

Referring to the accompanying drawings,—Figure 1 is a side elevation of a machine in which the present invention is embodied, certain portions of the driving gearing being omitted; Fig. 2 is an elevation looking at the opposite side of the machine from that shown in Fig. 1; Fig. 3 is a top plan view of the machine; Fig. 4 is an elevation of the measuring cylinder and means for discharging the dough therefrom; Fig. 4ª is a detail section showing the means for controlling and regulating the capacity of the pockets in the measuring cylinder; Fig. 5 is a detail section of a portion of one end of the cylinder shown in Fig. 4, the plane of the section being substantially parallel with and intersecting the axis of rotation of the cylinder; Fig. 6 is an end elevation of the cylinder and of the parts connected thereto; Fig. 7 is a section in a transverse plane through oppositely disposed measuring pockets in the cylinder; Figs. 8, 9 and 10 are detail views of the parts for operating the plungers in the pockets of the arrangement shown in Figs. 1 to 7; Figs. 11 and 12 are sectional views in longitudinal and transverse planes, respectively, showing a modified arrangement of the mechanism for moving the plungers and discharging the dough from the pockets; Figs. 13, 14 and 15 are sectional views in transverse planes showing other modified arrangements of the plunger operating connections.

Similar letters of reference in the several figures indicate the same parts.

The machine adopted for illustrating the present invention embodies in its construction a hopper A into which the dough to be divided is deposited, and in the bottom of the said hopper there is a reciprocatory cut off or knife connected with a knife stem B, while below said cut off or knife there is a reciprocatory plunger or head D adapted to advance the dough from the bottom of the hopper to the measuring cylinder E and to force the same into the pockets in said cylinder at a substantially predetermined pressure. This system of operation is well set forth in my patent hereinbefore referred to, and needs no further description. While the operating mechanism for the cut off and plunger is in its general characteristics similar to that of the patents before referred to, it differs therefrom in minor features and may be briefly described as follows:—A cam shaft F is journaled in the frame F' of the machine and receives rotary motion through the medium of a large gear wheel G at one end with which a pinion G', forming part of a train of drive gearing, starting with the fast and loose pulleys G², meshes.

A weighted bell crank lever formed by arms $g, g'$ is mounted on a transverse shaft $g^2$, the arm $g$ being pivotally connected by a link connection $g^3$ with the rear end of the plunger D, while an adjustable weight $g^4$ is mounted on the arm $g'$. The weight $g^4$ serves as the means for advancing the plunger and dough and for forcing the dough into the measuring pockets, while a cam $g^5$ on the shaft F serves as the means for retracting the plunger and elevating the weight $g^4$. The knife or cut off is operated by links C connected at one end with the cut off stem B and at the opposite end with the upper ends of lever arms C', journaled in the main frame and one having at its lower end, below the shaft $c$, connecting the levers a projection or roller $c'$ adapted to coöperate with a cam groove $c^2$ on the inner face of the gear G.

The measuring cylinder or part E having chambers or pockets therein for the reception of the dough is journaled in bearings $e$ in the main frame, and at one end is provided with means whereby it is given an intermittent rotary movement, in the present machine each movement corresponding to substantially one half of a revolution. The mechanism for rotating the cylinder is similar to that at present in use and generally as set forth in my patent before referred to. Briefly, it embodies a chain or flexible connection $E'$ connected at one end with a crank pin $e'$ on the gear wheel G, and at the opposite end with a drum or pulley $E^2$ journaled on the end of the cylinder E and adapted to connect therewith through a pawl and ratchet connection not illustrated herein.

In machines of this type it is well understood that means must be provided whereby the capacity of the measuring pockets may be varied or adjusted to suit the character and condition of the particular batch of dough being divided in order that the measured portions may produce loaves of a given standard weight, and in the present machine not only is provision made whereby this result may be accomplished while the machine is in operation, but through mechanism which may in part form part of the adjusting means, provision is made whereby the dough may be positively discharged from the measuring pockets or receptacles, the machine of the present application differing in this respect from the machines of the patents heretofore referred to.

The cylinder itself is conveniently, but not necessarily formed in four sections, that is to say, two end sections H, each having one of the journals $h$ formed thereon and two segmental sections $H'$ secured at their ends to the end sections H, the spaces between the segmental sections and end sections being sub-divided by partitions $H^2$ to form the pockets or compartments.

The journals $h$ are made of hollow or tubular form, and in each there is, in the construction shown in Figs. 1 to 10, journaled a hub or bearing $i$ on a plunger operating lever I, best seen in Figs. 8 and 10. The hubs $i$ are perforated for the reception of a square or irregularly shaped shaft K, whereby the shaft may be moved longitudinally through the levers I, and utilized as the means whereby oscillatory movement may be imparted to said levers. The levers I are slotted at their ends on opposite sides of the shaft and are adapted to coöperate with rounded bearings $l$ on longitudinally extending bars L which at their ends are guided in bearings or slideways formed between the ends of the sections H and gibs $h'$ held in place by bolts $h^2$. The bars L being guided as described and coöperating with the oppositely extending ends of the levers I will be moved simultaneously in opposite directions by the oscillation of the shaft K. The inner ends of plungers M working in the measuring pockets of the cylinder, are suitably connected to said bars preferably by detachable connections, whereby the plungers may be detached from the bars and removed for cleaning purposes. As shown in Fig. 7, the connections between the plungers and bars are formed by set screws $m$.

The shaft K extends out through one of the tubular journals $h$ and is adapted for the reception of a spiral screw N, which, in the form of apparatus shown in Figs. 4 to 6, is rigidly attached to the shaft K and might be an integral part thereof. This spiral screw N is preferably provided with a series of inclines or teeth $n$ having a very coarse or steep pitch. The screw N is adapted to mesh with a nut O secured to one end of the cylinder H, preferably by means of set screws $o$, passing through slotted apertures in the flange of the nut O to permit of a limited adjustment for wear between the inclines or teeth of the screw and nut. With this construction it is obvious that axial movement of the screw and shaft on which it is mounted, will impart thereto a rotary movement with relation to the cylinder, entirely regardless of the rotary movement of the cylinder itself. This relative rotary or oscillatory movement of the shaft K is utilized as the means whereby the plungers M of the measuring pockets are moved in and out in a positive manner as distinguished from the practice heretofore pertaining in machines of this kind, wherein the movement of the plungers in the pockets was controlled almost exclusively by the dough itself.

For driving or imparting axial movement to the screw it is provided near its outer end with an annular channel $n'$ adapted for the reception of a bearing $n^2$, Fig. 3, with which the forked end of a lever P coöperates. Lever P is journaled in bearings on one side of the frame, preferably by being mounted centrally on a shaft $p$, which shaft is journaled in the bearings $p'$, the outer ends of the shaft being adapted for the reception of coil springs $p^2$ for moving the upper end of the lever and screw outwardly. The opposite end of the lever carries an antifriction roller $P'$ adapted to bear on the end face of a cylindrical cam $P^2$ mounted on the cam shaft F before referred to. The cam $P^2$ operates to move the screw inwardly in a positive manner, and to thereby rotate the shaft K in a direction to force the plungers M outwardly to the limit of their movement, preferably as determined by the engagement of the bars L with the end walls of their respective slideways.

The capacity of the pockets is adjusted and determined by limiting the outward movement of the operating screw and thereby limiting the inward movement of the plungers themselves. For limiting the outward movement of the screw N it is obvious that an adjustable stop of any suitable character may be employed which may be directly controlled by the operator in accordance with the requirements of the particular batch of dough being divided. Conveniently, the side frame of the machine is provided with a projection or bearing Q, best seen in Fig. 4$^a$ and in this bearing an adjustable stop Q', Figs. 2, 3 and 4, is mounted to slide, its movements being controlled by a long adjusting screw Q$^2$ having on its outer end a hand wheel Q$^3$. The hand wheel may be provided with a series of graduations indicating the adjustments in accordance with the capacity of the pockets, and the end of the screw or shaft which contacts with the stop Q' may be conveniently provided with a hardened projection $n^3$, although it will be understood that the contacting face or parts of the stop and screw may be made to conform to the convenience or desire of the manufacturer of the machine.

In the operation of the machine as thus far described, and assuming that the plungers in the pockets are retracted and the pockets on one side in line with the discharge from the head D, the said head D advances and fills the pockets with dough, whereupon the cylinder is rotated so as to carry the filled pockets upwardly, cutting off the surplus dough, and when the pockets have turned to a point where they are beyond the supply opening, the plunger D returns to its retracted position. At a proper point in the rotation of the cylinder E the cam P$^2$ becomes effective to force the screw N inwardly, thereby forcing the plungers M outwardly, so as to discharge the dough from the pockets. The dough is thereby delivered onto a suitable table or conveyer, not shown herein, and before the opposite pockets have reached the filling position, the cam P$^2$ has rotated to a point where the lever P is released and under the action of the springs $p^2$ its upper end is moved outwardly, thereby returning the screw to its outer position against the adjustable stop Q'. This outward movement retracts the plungers M and when the cylinder has completed its movement, said pockets will be in line with the filling aperture ready for another charge or quantity of dough to be divided.

Obviously, the particular mechanism for converting the axial movement of the screw into transverse movement for operating the plungers M may be varied within wide limits, and at the same time retain the capacity of the machine, both for moving the plungers M positively to discharge the dough and to adjustably limit the inward movement so as to vary the capacity of the pockets. In Figs. 11 to 15, inclusive, various modifications along this general line are illustrated.

In Figs. 11 and 12 the shaft R extends longitudinally through the measuring cylinder and corresponds to the shaft K heretofore referred to. It rotates, but does not move longitudinally in the cylinder, and upon it there is keyed a series of oppositely extending arms R' connected by links $r$ with the plungers $r'$. The outer end of the shaft is square or of an irregular shape at R$^2$, and upon it slides the screw which, in this instance, is indicated by the reference letter N'. In other respects the construction is similar to that heretofore described, and in operation the screw N' by its axial movement imparts rotary or oscillatory movement to the shaft R, thereby positively moving the plungers $r'$ in and out. Outward movement of the plungers may be limited by shoulders $r^2$ on the links $r$ contacting with the inner edges of the cylinder segments H', as will be readily understood from an inspection of Fig. 12. In Fig. 13 the pockets for the plungers S are tangentially arranged, and the plungers are mounted on the ends of stems $s$ working in bearings in flanges $s'$ in the cylinder, whereby widely separated bearing points are provided for keeping the plungers in proper alinement. In this instance, oppositely extending arms R' on the shaft R are connected by links $s^2$ with the plungers and operate them in the manner heretofore described in connection with Figs. 11 and 12. In Fig. 14 the arrangement of pockets illustrated in Fig. 13 is followed, but the stems of the plungers, lettered in this instance T, are in the form of rack bars, the teeth $t$ of which mesh with pinions or gear wheels $t'$ on the shaft, whereby when the shaft is oscillated in one direction or the other, the plungers will be advanced or retracted, as the case may be.

In Fig. 15 the plungers are pivoted with inwardly extending arms U pivotally connected at $u$ directly with the oppositely extending arms R', and in order to allow for the slight oscillation of the plungers themselves, the edges of the plungers may be rounded or cut away slightly, as indicated at V, thereby preventing any binding of the plungers in the pockets and at the same time maintaining a close fit between the front edges of the plungers and the walls of the pockets in which they work. In this instance, outward movement of the plungers is limited by shoulders *v* on the arms U which come in contact with the inner edges of the pockets or wall of the cylinder segment.

Aside from the advantages incident to the use of the positively acting mechanism for moving the plungers outwardly for discharging the dough from the pockets, it will be noted that the construction illustrated and described is particularly advantageous in the arrangement of the operating mechanism both for the cylinder, the cut off and the main plunger for advancing the dough and forcing the same into the pockets, inasmuch as all of the operating cams are mounted on a single shaft (F in the accompanying drawings) and when once adjusted and positioned thereon in proper relative position, their relation is fixed and need not be disturbed in taking the machine down for cleaning or repair. This is an important advantage, inasmuch as machines of this type are usually operated by persons unskilled in mechanics, who find it exceedingly difficult to reset the parts in their proper relation for securing the proper sequence of operations or the timing necessary for efficient and rapid operation.

What I claim is:—

1. In a dough divider, the combination with dough feeding mechanism and a rotary cylinder, having measuring pockets therein, and a tubular journal, of plungers in said pockets, adjustable means for limiting the inward movement of the plungers to vary the capacity of the pockets and means periodically operating axially through the tubular journal of the cylinder for positively moving the plungers to discharge the dough from the pockets.

2. In a dough divider, the combination with dough feeding mechanism and a rotary cylinder having measuring pockets therein, of plungers in the pockets, a plunger operating mechanism for positively advancing the plungers to discharge the dough extending out through one end of the cylinder, intermittently moving driving mechanism for the plunger operating mechanism operating independent of the cylinder movement and means for varying the range of inward movement of the plungers to vary the capacity of the pockets.

3. In a dough divider, the combination with dough feeding mechanism and a rotary cylinder having measuring pockets therein, of plungers in the pockets, a shaft mounted in to rotate with and movable independently of the cylinder, connections intermediate the shaft and plungers for positively advancing the same when the shaft is moved with relation to the cylinder, driving mechanism moving independent of the cylinder movement for moving the shaft and adjustable means for limiting the inward movement of the plungers to vary the capacity of the pockets.

4. In a dough divider, the combination with dough feeding mechanism, a rotary cylinder having measuring pockets therein and plungers in the pockets, of a shaft mounted in and extending out at one end of the cylinder, said shaft being adapted to rotate with and to move independently of the cylinder, connections intermediate the shaft and plungers whereby the plungers are moved to discharge the dough, axially movable driving connections for the shaft at one end and independent of the cylinder movement and an adjustable stop for limiting the inward movement of the plungers to vary the capacity of the pockets.

5. In a dough divider, the combination with dough feeding mechanism, a rotary cylinder having measuring pockets therein and plungers in the pockets, of mechanism for advancing the plungers to positively discharge the dough comprising an element movable longitudinally of the axis of the cylinder and adjustable means for limiting the inward movement of the plungers to vary the capacity of the pockets.

6. In a dough divider, the combination with dough feeding mechanism, a rotary cylinder having measuring pockets therein and plungers in the pockets, of mechanism for advancing the plungers to positively discharge the dough embodying a part projecting axially from the cylinder and driving mechanism for moving the same longitudinally of the axis of the cylinder, and an adjustable stop for limiting the inward movement of the plungers to vary the capacity of the pockets.

7. In a dough divider, the combination with dough feeding mechanism, a rotary cylinder having measuring pockets therein and plungers in the pockets, of a shaft mounted to oscillate in the cylinder, connections intermediate the shaft and plungers whereby the plungers will be advanced to positively discharge the dough, driving connections for oscillating the shaft independently of the cylinder movement and a stop adjustable axially of the shaft for limiting the movement of the shaft in one direction to vary the capacity of the pockets.

8. In a dough divider, the combination with a dough feeding mechanism, a rotary cylinder having measuring pockets therein and plungers in the pockets, of a shaft mounted to oscillate in the cylinder, connections intermediate the shaft and plungers whereby the plungers will be advanced to positively discharge the dough, operating connections for the shaft at one end of the cylinder movable longitudinally of the cylinder to oscillate the shaft with relation thereto and means for so moving said connections periodically.

9. In a dough divider the combination with dough feeding mechanism, a cylinder having measuring pockets therein and plungers in the pockets, of a shaft movably mounted in the cylinder, connections intermediate the shaft and plungers whereby the plungers will be advanced to positively discharge the dough and means for moving the shaft with relation to the cylinder for advancing and retracting the plungers embodying coöperating inclines on the cylinder and shaft respectively, and means for periodically moving one of said inclines with relation to the other.

10. In a dough divider, the combination with dough feeding mechanism, a cylinder having measuring pockets therein and plungers in the pockets, of a shaft mounted to oscillate in the cylinder, connecting intermediate the shaft and plungers whereby the plungers will be advanced to positively discharge the dough, an axially movable screw for the shaft and coöperating with the cylinder and means for periodically and bodily moving the screw axially of the cylinder to advance and retract the plungers.

11. In a dough divider, the combination with dough feeding mechanism, a cylinder having measuring pockets therein and plungers in the pockets, of a shaft mounted to oscillate in the cylinder, connections intermediate the shaft and plungers whereby the plungers will be advanced to positively discharge the dough, an axially movable screw on the shaft, a nut fixed on the cylinder with which the screw coöperates and means for moving the screw axially to oscillate the shaft with relation to the cylinder and thereby advance the plungers to discharge the dough from the pockets.

12. In a dough divider, the combination with dough feeding mechanism, a cylinder having measuring pockets therein and plungers in the pockets, of a shaft mounted to oscillate in the cylinder, connections intermediate the shaft and plungers whereby the plungers will be advanced to positively discharge the dough, an axially movable screw on the shaft, a nut through which the screw passes adjustably fixed on the cylinder and means for moving the screw axially in the nut to oscillate the shaft.

13. In a dough divider, the combination with dough feeding mechanism, a cylinder having a plurality of measuring pockets therein opening outwardly on opposite sides of the cylinder and plungers in the pockets, of bars extending longitudinally of and mounted to slide transversely in the cylinder, detachable connections between the bars and plungers respectively, an oscillatory shaft in the cylinder, connections intermediate the shaft and both bars, and means for oscillating the shaft whereby the bars will be moved transversely to simultaneously advance the oppositely disposed plungers.

14. In a dough divider, the combination with dough feeding mechanism, a cylinder having measuring pockets therein and plungers in the pockets, of a shaft in the cylinder, connections between the shaft and plungers for advancing the latter, a lever pivoted on the frame, connections intermediate the lever and shaft, a spring for moving the lever in one direction, a cam for moving it in the opposite direction and means for adjustably determining the range of movement imparted by the spring whereby the capacity of the pockets may be varied.

15. In dough dividing mechanism, a cylinder having a pocket, an ejecting plunger therein, and periodically operating means movable axially of the cylinder for positively effecting movements of the plunger to periodically advance the plunger to discharge the dough and to withdraw the plunger to open the pocket.

FRANK H. VAN HOUTEN.

Witnesses:
CLAUDE VAN NOSTRAN,
JOHN M. VAN HOUTEN.

Copies of this patent may be obtained for five cents each, by addressing the "Commissioner of Patents, Washington, D. C."